E. B. ANDERSON.
NUT LOCK.
APPLICATION FILED AUG. 23, 1910.
995,760.
Patented June 20, 1911.
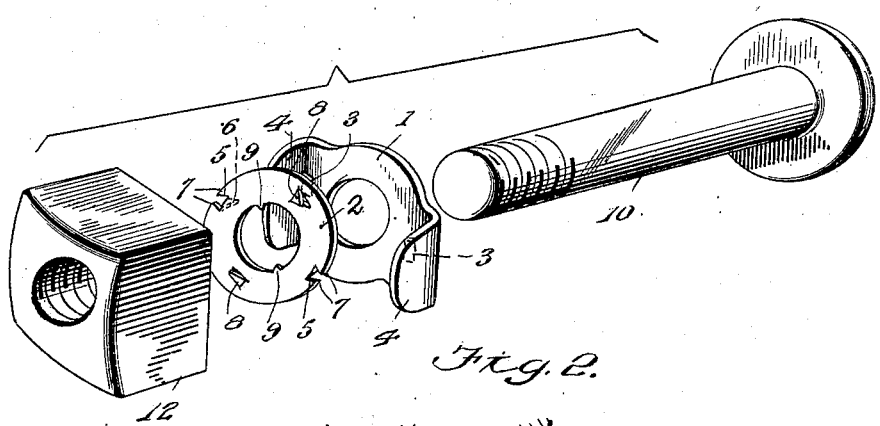
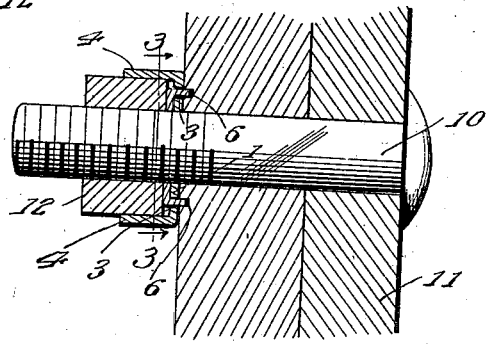
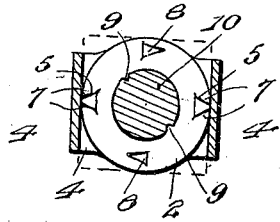
Witnesses
Inventor
E. B. Anderson.
By
Attorneys.

UNITED STATES PATENT OFFICE.

ELIAS B. ANDERSON, OF ROCK FALLS, ILLINOIS.

NUT-LOCK.

995,760. Specification of Letters Patent. Patented June 20, 1911.

Application filed August 23, 1910. Serial No. 578,503.

*To all whom it may concern:*

Be it known that I, ELIAS B. ANDERSON, a citizen of the United States, residing at Rock Falls, in the county of Whiteside and State of Illinois, have invented certain new and useful Improvements in Nut-Locks, of which the following is a specification.

The present invention comprehends certain new and useful improvements in nut locks, and the invention has for its object to provide an improved device of this character which is capable of being applied to an ordinary bolt and nut, and which serves to positively retain the nut in adjusted position on the bolt against loosening movement under the influence of vibration or jar or the like.

A further object of the invention is the provision of a lock washer including primarily an annular section which is formed with outstanding teeth adapted to engage the nut, and which is held against relative turning movement by means of lugs arranged to bite into the bolt and spurs adapted to be embedded in the work. This washer section is preferably employed in conjunction with another washer section, although not necessarily so.

A still further object of the invention is to form a lock washer which may be conveniently applied to or removed from the bolt, which is thoroughly reliable and efficient in operation, which is quite simple, durable and strong in construction, and which is susceptible of being easily and cheaply manufactured.

With these and other objects in view that will more fully appear as the description proceeds, the invention consists in certain constructions and arrangements of the parts that I shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a perspective view showing the nut, lock washer and bolt in juxtaposition; Fig. 2 is a longitudinal section of the nut lock with the parts assembled; and, Fig. 3 is a transverse section on the line 3—3 of Fig. 2.

Corresponding and like parts are referred to in the following description and indicated in all the views of the drawing by the same reference characters.

In carrying out my invention I provide a lock washer which preferably consists of a pair of separate co-acting sections, designated 1 and 2 respectively. The sections are of annular form and have both their external and internal diameters substantially equal. The section 1 is formed with a pair of openings 3 extending entirely therethrough at substantially diametrically opposite points. A pair of ears 4 outstand from the periphery of the section 1 opposite the respective openings. The ears initially lie in the plane of the section, but are adapted to be bent into angular relation to said plane in the use of the lock washer, as hereinafter more particularly described. The section 1 is preferably formed of soft steel or iron in order to render the ears more pliable and thus permit the ears to be bent more readily into angular positions.

The washer section 2 abuts against one side of the section 1 and is provided in its periphery at substantially diametrically opposite points with dove tail recesses 5. The metal which is struck from the section 2 in order to form these recesses, is bent substantially perpendicularly to constitute spurs 6 which are received in the respective openings 3, whereby to establish interlocking connections between the washer sections to hold the same against relative turning movement. The spurs project through and beyond the openings 3 and are suitably sharpened at their extremities, as shown. The washer section 2 is made of tempered steel or the like, for the purpose of enabling the spurs to penetrate hard substances. By virtue of the dove-tail formation of the recesses the corners of the metal of both sides thereof constitute engaging points 7, for a purpose to be presently disclosed. A plurality of teeth 8 are struck from the washer section 2 between its inner and outer edges, and all face in the same circular direction. At its inner edge this section is preferably equipped with a pair of inwardly disposed projections or lugs 9 that are located diametrically opposite to each other.

The particular construction of the washer section 2 forms the subject matter of the present invention.

In practice, the separate sections of the washer are placed in abutting relation and are interlocked, as above described. The ears are then bent obliquely to the plane of the washer section 1 and on the side thereof adjacent to the washer section 2, so as to bear frictionally against the engaging points 7. By this means, the two sections are retained in association and may be slipped as a unit on the end of the bolt 10, the ears serving as finger pieces through the instrumentality of which the lock washer may be handled by the operator and conveniently placed in position. The washer section 1 is arranged in abutting relation to the work 11. The nut 12 is screwed on the extremity of the bolt and is tightened against the section 2, whereby to automatically embed the spurs 6 in the work and thus hold both sections of the washer against turning movement. After the nut has been screwed home the ears 4 are bent outwardly substantially at right angles to the lock washer to bear firmly against opposite peripheral faces of the nut to positively hold the same in adjusted position on the bolt against accidental turning movement in both directions. The teeth 8, which outstand from the outer face of the washer section 2, engage the inner face of the nut and provide additional means for holding the nut against loosening movement. The nut is thus independently locked by both of the co-acting sections of the washer. The projections or lugs 9 grip the threads of the bolt to form a still further lock. It will be observed that the teeth 8 face in the opposite circular direction from that in which the nut is turned when tightened and will, therefore, yield inwardly so as not to interfere with the movement of the nut in said direction.

From the foregoing description in connection with the accompanying drawing, it will be apparent that I have provided an improved lock washer which may be applied to the ordinary bolts and nuts without any change in the construction of those parts. The washer is also quite simple and durable in construction and consists of comparatively few parts. Both sections of the washer are capable of being stamped in blank form from sheet metal, thereby permitting the washer to be easily and cheaply manufactured, and considerably enhancing the practical value of the invention. The nut lock is susceptible of general application and may be advantageously employed on jarring machinery or for various analogous purposes where a positive and reliable lock is required.

Having thus described the invention, what is claimed is:

In a nut lock, a washer section provided in its periphery at diametrically opposite points with spurs 6 said section being also formed between its inner and outer edges with teeth and at its inner edge with a pair of inwardly disposed lugs.

In testimony whereof I affix my signature in presence of two witnesses.

ELIAS B. ANDERSON. [L. S.]

Witnesses:
JOHN A. SWANSON.
ALEXANDER LYLE.